US012706078B2

(12) United States Patent
Jeong

(10) Patent No.: US 12,706,078 B2
(45) Date of Patent: Aug. 11, 2026

(54) APPARATUS FOR CONTROLLING NOISE ROAD NOISE VIA TRAINED MODEL AND METHOD THEREOF

(71) Applicants: Hyundai Motor Company, Seoul (KR); Kia Corporation, Seoul (KR)

(72) Inventor: Seok Hee Jeong, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 321 days.

(21) Appl. No.: 18/510,503

(22) Filed: Nov. 15, 2023

(65) Prior Publication Data

US 2025/0014561 A1 Jan. 9, 2025

(30) Foreign Application Priority Data

Jul. 6, 2023 (KR) ........................ 10-2023-0087866

(51) Int. Cl.
*G10K 11/178* (2006.01)

(52) U.S. Cl.
CPC .................. *G10K 11/17825* (2018.01); *G10K 2210/12821* (2013.01)

(58) Field of Classification Search
CPC ... G10K 11/17825; G10K 2210/12821; G10K 11/17883; G10K 11/17823; G10K 11/1783
USPC ... 381/71.4, 56, 71.1, 71.8, 71.11, 71.12, 86
See application file for complete search history.

(56) References Cited

U.S. PATENT DOCUMENTS 3,882,444 A * 5/1975 Robertson ............... G01S 15/02 367/92
11,587,544 B2 2/2023 Zafeiropoulos et al.
2009/0067638 A1* 3/2009 Sakamoto ........ G10K 11/17854 381/71.4
2018/0304899 A1* 10/2018 Cheng .................... G06N 3/045
2020/0219478 A1* 7/2020 Zaferopoulos ... G10K 11/17873
2021/0104218 A1* 4/2021 Zollner ............ G10K 11/17855

FOREIGN PATENT DOCUMENTS

KR 10-2020-0035033 A 4/2020

* cited by examiner

*Primary Examiner* — Vivian C Chin
*Assistant Examiner* — Douglas J Suthers
(74) *Attorney, Agent, or Firm* — MORGAN, LEWIS & BOCKIUS LLP

(57) ABSTRACT

An apparatus for controlling noise and a method thereof includes a memory that stores computer-executable instructions, and at least one processor that accesses the memory to execute the instructions, wherein the at least one processor may obtain a virtual road noise and a noise weight by applying an error input signal of a target time point to a trained noise control model, obtain a target road noise by applying the virtual road noise and a virtual road noise generated at a time point different from the target time point to a primary path, obtain a target control noise by applying the noise weight and a noise weight obtained at a time point different from the target time point to a secondary path, and perform noise control on the error input signal based on the target road noise and the target control noise.

20 Claims, 7 Drawing Sheets

APPARATUS FOR CONTROLLING NOISE ROAD NOISE VIA TRAINED MODEL AND METHOD THEREOF

CROSS-REFERENCE TO RELATED APPLICATION

The present application claims priority to Korean Patent Application No. 10-2023-0087866, filed on Jul. 6, 2023, the entire contents of which is incorporated herein for all purposes by this reference.

BACKGROUND OF THE PRESENT DISCLOSURE

Field of the Present Disclosure

The present disclosure relates to an apparatus for controlling noise and a method thereof, and more particularly, to a technology for controlling noise inside a vehicle generated from road noise.

Description of Related Art

When a vehicle is driven on a road, road noise is generated by the wheels of the vehicle. The road noise generated from an outside may be transmitted to the occupants of the vehicle.

The road noise generated from the outside may be reduced to a certain level by attaching a sound absorbing material or a sound insulating material to the vehicle. However, a scheme of reducing noise through such manners increases the weight of the vehicle and increases the price. Therefore, a technique of generating sound waves having opposite phases to road noise to reduce noise through the principle of superposition may be used.

An important factor in a technique of reducing noise through the principle of superposition in a vehicle is the location of an acceleration sensor. Vibration measured from an acceleration sensor should have a high correlation with road noise. However, when the correlation between the vibration measured from the acceleration sensor and the road noise is poor, there is a limit in that divergence occurs, so it is necessary to develop a technology for overcoming the limit.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus for controlling noise configured for training a noise control model based on removal of an internal noise of a vehicle by a predetermined amount by applying an estimation road noise measured from an acceleration sensor mounted in the vehicle to a feedforward active noise control (ANC) model, and a method thereof.

Another aspect of the present disclosure provides an apparatus for controlling noise configured for performing noise control on an error input signal based on a virtual road noise and a noise weight obtained by applying an error input signal at a target time point to a trained noise control model, and a method thereof.

Yet another aspect of the present disclosure provides an apparatus for controlling noise configured for obtaining a first weight and a second weight related to noise removal at a target time point based on an error input signal at a time point different from the target time point and an error output signal at a time point different from the target time point, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling noise includes a memory that stores computer-executable instructions, and at least one processor that accesses the memory to execute the instructions, wherein the at least one processor may obtain a virtual road noise and a noise weight by applying an error input signal of a target time point to a trained noise control model, obtain a target road noise by applying the virtual road noise and a virtual road noise generated at a time point different from the target time point to a primary path, obtain a target control noise by applying the noise weight and a noise weight obtained at a time point different from the target time point to a secondary path, and perform noise control on the error input signal based on the target road noise and the target control noise.

According to an exemplary embodiment of the present disclosure, the at least one processor may obtain a first weight and a second weight related to noise removal of the target time point, based on an error input signal of a time point different from the target time point and an error output signal of a time point different from the target time point.

According to an exemplary embodiment of the present disclosure, the at least one processor may obtain an estimation error signal by applying an estimation road noise measured from an acceleration sensor mounted in a vehicle to a feedforward active noise control (ANC) model, remove an internal noise of the vehicle based on the estimation road noise and an estimation weight, and generate a training input including the estimation error signal and a training output in which the estimation road noise and the estimation weight are paired, based on removal of the internal noise by a predetermined amount of noise.

According to an exemplary embodiment of the present disclosure, the at least one processor may train the noise control model based on the training input and the training output.

According to an exemplary embodiment of the present disclosure, the at least one processor may train the noise control model based on the training input in which a road flag representing each of at least one road condition and the estimation error signal are paired, and the training output.

According to an exemplary embodiment of the present disclosure, the at least one processor is configured to generate a first virtual road noise by applying the first weight to the virtual road noise, generate a second virtual road noise by applying the second weight to the virtual road noise obtained at the time point different from the target time point, and obtain the target road noise by applying the first virtual road noise and the second virtual road noise to the primary path.

According to an exemplary embodiment of the present disclosure, the at least one processor is configured to generate a first target weight by applying the first weight to the noise weight, generate a second target weight by applying the second weight to the noise weight obtained at the time point different from the target time point, and obtain the target control noise by applying the first target weight, the second target weight, and the virtual road noise to the secondary path.

According to an exemplary embodiment of the present disclosure, the at least one processor may obtain a third target weight from an adaptive filter at the target time point, and obtain the target control noise by applying the first target weight, the second target weight, the third target weight, and the virtual road noise to the secondary path.

According to an exemplary embodiment of the present disclosure, the at least one processor may obtain an error output signal based on the target road noise and the target control noise, and set the error output signal as an error input signal at a time point subsequent to the target time point.

According to an exemplary embodiment of the present disclosure, the at least one processor may obtain the error output signal by subtracting the target control noise from the target road noise.

According to another aspect of the present disclosure, a method of controlling noise includes obtaining a virtual road noise and a noise weight by applying an error input signal of a target time point to a trained noise control model, obtaining a target road noise by applying the virtual road noise and a virtual road noise generated at a time point different from the target time point to a primary path, obtaining a target control noise by applying the noise weight and a noise weight obtained at a time point different from the target time point to a secondary path, and performing noise control on the error input signal based on the target road noise and the target control noise.

According to an exemplary embodiment of the present disclosure, the method may further include obtaining a first weight and a second weight related to noise removal of the target time point, based on an error input signal of a time point different from the target time point and an error output signal of a time point different from the target time point.

According to an exemplary embodiment of the present disclosure, the obtaining of the road noise and the weight may include obtaining an estimation error signal by applying an estimation road noise measured from an acceleration sensor mounted in a vehicle to a feedforward active noise control (ANC) model, removing an internal noise of the vehicle based on the estimation road noise and an estimation weight, and generating a training input including the estimation error signal and a training output in which the estimation road noise and the estimation weight are paired, based on removal of the internal noise by a predetermined amount of noise.

According to an exemplary embodiment of the present disclosure, the method may further include training the noise control model based on the training input and the training output.

According to an exemplary embodiment of the present disclosure, the method may further include training the noise control model based on the training input in which a road flag representing each of at least one road condition and the estimation error signal are paired, and the training output.

According to an exemplary embodiment of the present disclosure, wherein the obtaining of the target road noise may include generating a first virtual road noise by applying the first weight to the virtual road noise, generating a second virtual road noise by applying the second weight to the virtual road noise obtained at the time point different from the target time point, and obtaining the target road noise by applying the first virtual road noise and the second virtual road noise to the primary path.

According to an exemplary embodiment of the present disclosure, the obtaining of the target control noise may include generating a first target weight by applying the first weight to the noise weight, generating a second target weight by applying the second weight to the noise weight obtained at the time point different from the target time point, and obtaining the target control noise by applying the first target weight, the second target weight, and the virtual road noise to the secondary path.

According to an exemplary embodiment of the present disclosure, the obtaining of the target control noise may include obtaining a third target weight from an adaptive filter at the target time point, and obtaining the target control noise by applying the first target weight, the second target weight, the third target weight, and the virtual road noise to the secondary path.

According to an exemplary embodiment of the present disclosure, the method may further include obtaining an error output signal based on the target road noise and the target control noise, and setting the error output signal as an error input signal at a time point subsequent to the target time point.

According to an exemplary embodiment of the present disclosure, the obtaining of the error output signal may include obtaining the error output signal by subtracting the target control noise from the target road noise.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
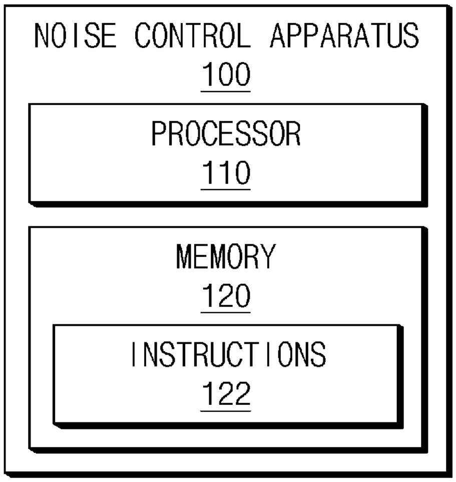
FIG. 1 is a block diagram illustrating an apparatus for controlling noise according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure. Various embodiments of the present disclosure may be described with reference to accompanying drawings. Accordingly, those of ordinary skill in the art will recognize that modification, equivalent, and/or alternative on the various embodiments described herein may be variously made without departing from the scope and spirit of the present disclosure. With regard to description of drawings, similar elements may be marked by similar reference numerals.

Terms, such as first, second, A, B, (a), (b) or the like may be used herein when describing components of the present disclosure. The terms are provided only to distinguish the elements from other elements, and the essences, sequences, orders, and numbers of the elements are not limited by the terms. Furthermore, unless defined otherwise, all terms used herein, including technical or scientific terms, include the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure. For example, the terms, such as “first”, “second”, and the like used herein may refer to various elements of various embodiments of the present disclosure, but do not limit the elements. For example, “a first user device” and “a second user device” indicate different user devices regardless of the order or priority. For example, without departing the scope of the present disclosure, a first element may be referred to as a second element, and similarly, a second element may be referred to as a first element.

In an exemplary embodiment of the present disclosure included herein, the expressions “have”, “may have”, “include” and “comprise”, or “may include” and “may comprise” used herein indicate existence of corresponding features (e.g., elements such as numeric values, functions, operations, or components) but do not exclude presence of additional features.

It will be understood that when an element (e.g., a first element) is referred to as being “(operatively or communicatively) coupled with/to” or “connected to” another element (e.g., a second element), it may be directly coupled with/to or connected to the other element or an intervening element (e.g., a third element) may be present. In contrast, when an element (e.g., a first element) is referred to as being “directly coupled with/to” or “directly connected to” another element (e.g., a second element), it should be understood that there are no intervening element (e.g., a third element).

According to the situation, the expression “configured to” used herein may be used as, for example, the expression “suitable for”, “having the capacity to”, “designed to”, “adapted to”, “made to”, or “capable of”.

The term “configured to” must not mean only “specifically designed to” in hardware. Instead, the expression “a device configured to” may mean that the device is “capable of” operating together with another device or other components. CPU, for example, a “processor configured to perform A, B, and C” may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device. Terms used in the present disclosure are used to describe specified embodiments of the present disclosure and are not intended to limit the scope of the present disclosure. The terms of a singular form may include plural forms unless otherwise specified. All the terms used herein, which include technical or scientific terms, may include the same meaning which is generally understood by a person skilled in the art. It will be further understood that terms, which are defined in a dictionary and commonly used, should also be interpreted as is customary in the relevant related art and not in an idealized or overly formal sense unless so defined herein In various embodiments of the present disclosure. In some cases, even when terms are terms which are defined in an exemplary embodiment of the present disclosure, they may not be interpreted to exclude embodiments of the present disclosure.

In an exemplary embodiment of the present disclosure included herein, the expressions “A or B”, “at least one of A or/and B”, or “one or more of A or/and B”, and the like used herein may include any and all combinations of one or more of the associated listed items. For example, the term “A or B”, “at least one of A and B”, or “at least one of A or B” may refer to all of the case (1) where at least one A is included, the case (2) where at least one B is included, or the case (3) where both of at least one A and at least one B are included. Furthermore, as used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. A phrase such as “at least one of A, B, C, or any combination thereof” may include A or B or C or a combination thereof such as AB or ABC.

Hereinafter, various exemplary embodiments of the present disclosure will be described in detail with reference to FIGS. 1 to 7.

FIG. 1 is a block diagram illustrating an apparatus for controlling noise according to an exemplary embodiment of the present disclosure.

An apparatus 100 for controlling noise according to various exemplary embodiments of the present disclosure may include a processor 110 and a memory 120 for storing instructions 122. For example, the apparatus 100 for controlling noise may train a noise control model, and may perform noise control in a vehicle without an acceleration sensor based on the trained noise control model.

In connection with training of the noise control model, the apparatus 100 for controlling noise may apply an estimation road noise measured from an acceleration sensor mounted in a vehicle to a feedforward active noise control (ANC) model to obtain an estimation error signal and an estimation weight.

In the instant case, the feedforward ANC model may be different model from a noise control model to be trained by the apparatus 100 for controlling noise. The apparatus 100 for controlling noise may remove an internal noise of the vehicle based on the estimation road noise and the estimation weight. A process in which the apparatus 100 for controlling noise removes internal noise of a vehicle may indicate a process of training a noise control model by the apparatus 100 for controlling noise.

For example, when internal noise is removed by a predetermined amount of noise, the apparatus 100 for controlling noise may select an estimation road noise and an estimation weight that satisfy it from a plurality of estimation road noises and estimation weights. The apparatus 100 for controlling noise may use the selected estimation error signal as a training input and train a noise control model that determines a training output in which the selected estimation road noise and the selected estimation weight are paired.

For reference, the process of training the noise control model by the apparatus 100 for controlling noise may be performed in a development stage prior to vehicle mass production, but embodiments are not limited thereto. For example, the apparatus 100 for controlling noise may additionally train the noise control model after vehicle mass production. However, in an exemplary embodiment of the present disclosure, for convenience of description, it is mainly described that the process of training the noise control model is a process performed in the vehicle development stage. Furthermore, the detailed description of training the noise control model will be described with reference to FIG. 3 and FIG. 4 below.

Regarding performing noise control, the apparatus 100 for controlling noise may perform noise control in a vehicle without an acceleration sensor based on the trained noise control model.

For example, the apparatus 100 for controlling noise may obtain a virtual road noise and a noise weight by applying an error input signal at a target time point to the trained noise control model. As described above, the estimation road noise may be noise measured from an acceleration sensor provided in the vehicle. Alternatively, the virtual road noise may be a virtual noise obtained from the trained noise control model. When there is no acceleration sensor in the vehicle, the apparatus 100 for controlling noise may obtain a virtual road noise instead of the estimation road noise from the trained noise control model. The apparatus 100 for controlling noise may perform noise control on an error input signal by applying the virtual road noise and the noise weight to a primary path and a secondary path, respectively. The detailed description of performing noise control will be described with reference to FIG. 5 and FIG. 6 below.

The processor 110 may execute software and may be configured for controlling at least one other component (e.g., a hardware or software component) connected to the processor 110. The processor 110 may also perform various data processing or determinations. For example, the processor 110 may store a virtual road noise, a noise weight, a target road noise, a target control noise, and an error input signal in the memory 120. The processor 110 may provide a user with a driving environment in which a road noise (e.g., a virtual road noise instead of the estimation road noise) is removed by a target control noise through a method of controlling noise described later.

For reference, the processor 110 may perform all operations performed by the apparatus 100 for controlling noise. Therefore, in an exemplary embodiment of the present disclosure, for convenience of description, the operations performed by the apparatus 100 for controlling noise is mainly referred to as the operations performed by the processor 110.

Furthermore, in an exemplary embodiment of the present disclosure, for convenience of description, the processor 110 is mainly referred to as a single processor, but embodiments are not limited thereto. For example, the apparatus 100 for controlling noise may include at least one processor. Each processor is configured to perform all operations related to the noise control operation.

The memory 120 may temporarily and/or permanently store various data and/or information required to perform noise control. For example, the memory 120 may store at least one of a virtual road noise, a noise weight, a target road noise, a target control noise, an error input signal, or a combination thereof.

Figure 2:
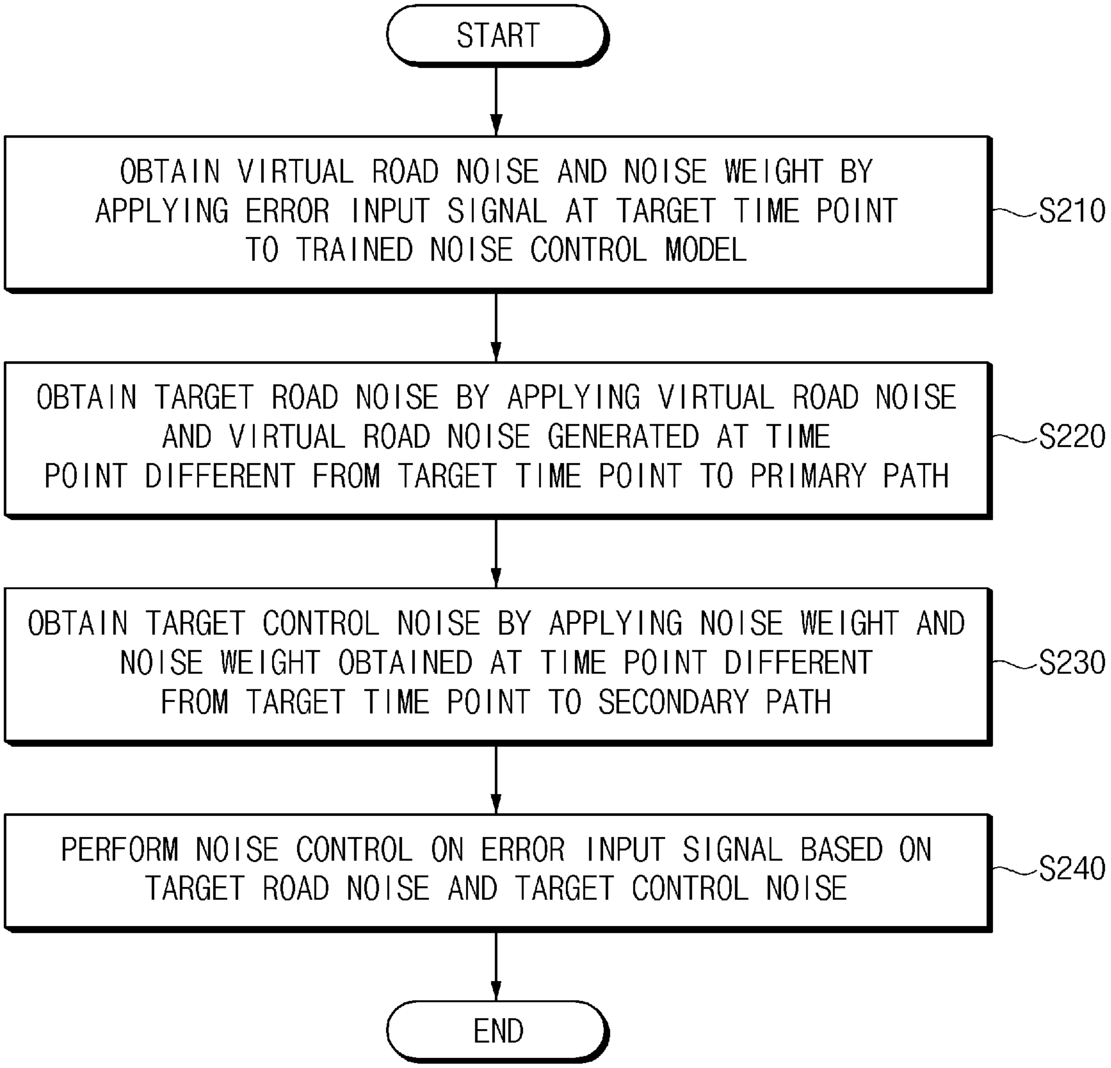
FIG. 2 is a flowchart illustrating a method of controlling noise according to an exemplary embodiment of the present disclosure.

FIG. 2 is a flowchart illustrating a method of controlling noise according to an exemplary embodiment of the present disclosure.

In operation S210, an apparatus for controlling noise (e.g., the apparatus 100 for controlling noise of FIG. 1) may obtain a virtual road noise and a noise weight by applying an error input signal at a target time point to a trained noise control model. For example, the target time point may indicate a time point when the apparatus for controlling noise performs noise control. Although described later, in an exemplary embodiment of the present disclosure, it is mainly described that the target time point is the (n+1)-th time point.

The error input signal may include a difference value between the target road noise and the target control noise at a time point (e.g., the n-th time point) preceding the target time point. For example, the apparatus for controlling noise may differentiate between the target road noise and target control noise at a time point preceding the target time point and set the error input signal at the target time point. The apparatus for controlling noise may perform noise control on the error input signal by applying the error input signal to the trained noise control model. In more detail, the apparatus for controlling noise may perform noise control on the virtual road noise obtained by applying the error input signal to the trained noise control model.

The virtual road noise, which is noise generated by a trained control model, may represent a noise virtually generated corresponding to a noise (e.g., a noise caused by friction between a real road surface and tires) caused by a vehicle travelling on a road. For example, when an acceleration sensor is provided in a vehicle, the apparatus for controlling noise may obtain an actual road noise (e.g., estimation road noise) through vibration measured from the vehicle acceleration sensor. To the contrary, when the vehicle does not have any acceleration sensors, the apparatus for controlling noise may obtain the virtual road noise by use of the trained control model. That is, the virtual road noise, which is a noise different from an actual road noise, may be a noise virtually generated (e.g., by a trained control model) to perform noise control when an acceleration sensor is not present in a vehicle.

The noise weight, which is a weight generated by the trained control model, may represent a parameter related to the virtual road noise. As will be described later, the apparatus for controlling noise may obtain a target control noise by applying the noise weight to the secondary path. The apparatus for controlling noise may perform noise control based on the target control noise obtained by the noise weight when there is no acceleration sensor in the vehicle.

In operation S220, the apparatus for controlling noise may obtain the target road noise by applying the virtual road noise and the virtual road noise generated at a different time point from the target time point to a primary path.

The primary path may represent a path in which noise is distorted by applying phenomena such as reflection, interference, and superposition of a sound wave to the virtual road noise. For example, the virtual road noise, which a noise generated by the trained control model, is a virtual noise that represents a noise generated between vehicle tires and vehicle suspension, and cannot be directly transmitted to the driver of the vehicle. In other words, the driver of the vehicle may audibly hear only the noise generated from the tires reflected by the interior of the vehicle, the steering wheel, or surrounding objects. Therefore, the apparatus for controlling noise may apply the virtual road noise to the primary path to obtain the target road noise that the driver of the vehicle can audibly hear.

The apparatus for controlling noise may apply a virtual road noise at a target time point and a virtual road noise at a time point different from the target time point to a primary path to obtain the target road noise. The details will be described later with reference to FIG. 5 below. For reference, in an exemplary embodiment of the present disclosure, for convenience of description, a time point, which is different from a target time point and precedes the target time point, is mainly described. However, a time point different from the target time point is not limited thereto, and may be a time point subsequent to the target time point.

In operation S230, the apparatus for controlling noise may obtain a target control noise by applying the noise weight and the noise weight obtained at a different time point from the target time point to the secondary path.

The secondary path may represent a path in which noise is distorted by applying phenomena such as reflection, interference, and superposition of antiphase noise (e.g., antiphase noise of virtual road noise) output from a vehicle speaker. For example, the apparatus for controlling noise may be configured to generate an antiphase noise of the virtual road noise by use of the virtual road noise and the noise weight. The apparatus for controlling noise may output the antiphase noise through the vehicle speaker. However, the antiphase noise output through the vehicle speaker is a noise that cannot be directly transmitted to the vehicle driver. In other words, the driver of the vehicle may audibly hear only the noise generated by the speaker and reflected by the interior of the vehicle, the steering wheel, or surrounding objects. Therefore, the apparatus for controlling noise may apply the noise weight to the secondary path to obtain the target control noise that the driver of the vehicle can audibly hear.

The target control noise may represent the antiphase noise of the virtual road noise. However, the target control noise is not limited thereto, and may represent a plurality of noises (e.g., modified virtual road noise) for controlling the virtual road noise. For reference, in an exemplary embodiment of the present disclosure, for convenience of description, the target control noise is mainly referred to as antiphase noise of the virtual road noise, which is noise to which a noise weight is applied to the virtual road noise.

The apparatus for controlling noise may apply a noise weight at a target time point and a noise weight at a time point different from the target time point to the secondary path to obtain the target control noise. The details will be described later with reference to FIG. 5 below.

In operation S240, the apparatus for controlling noise may perform noise control on the error input signal based on the target road noise and the target control noise.

For example, the apparatus for controlling noise may obtain the virtual road noise by applying the error input signal, which is a difference value between a target road noise at a time point preceding the target time point and a target control noise at a time point preceding the target time point, to a noise control model. The apparatus for controlling noise may obtain the target control noise through the secondary path to control the obtained virtual road noise. The apparatus for controlling noise may be configured for controlling the noise in the vehicle according to the error input signal at the target time point based on the target control noise.

Figure 3:
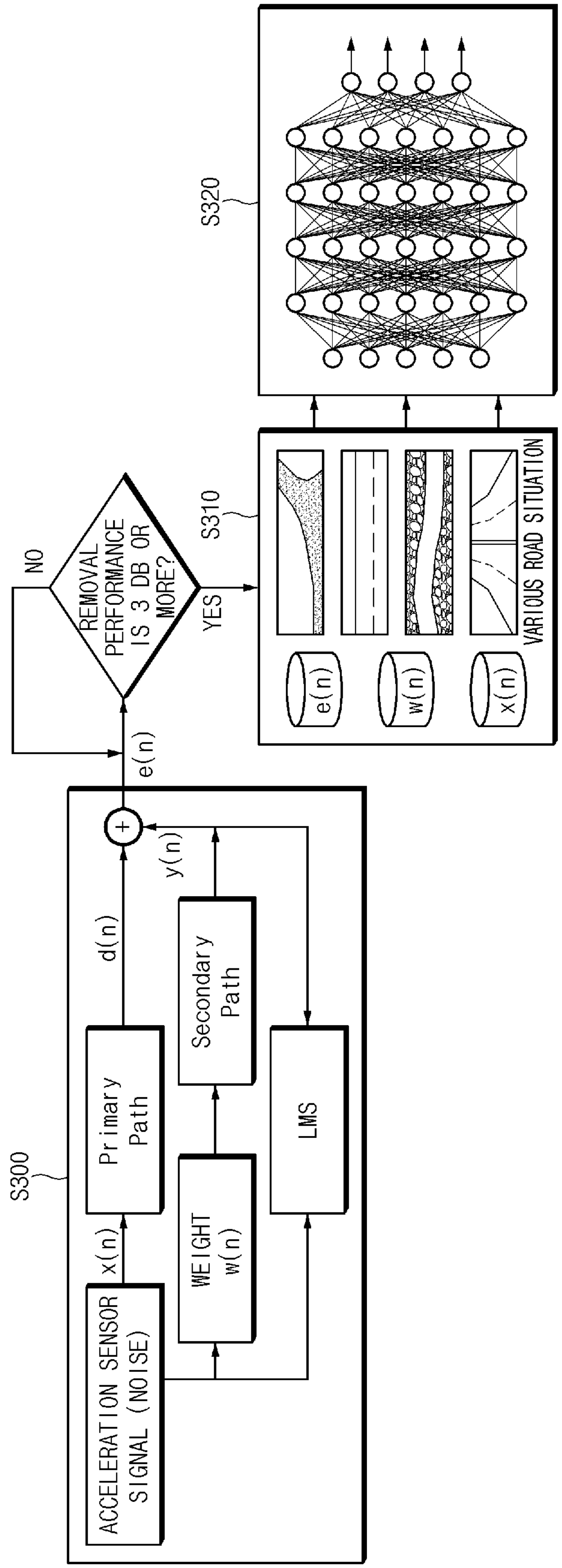
FIG. 3 is a diagram illustrating an example of training a noise control model in an apparatus for controlling noise according to an exemplary embodiment of the present disclosure.

FIG. 3 is a diagram illustrating an example of training a noise control model in an apparatus for controlling noise according to an exemplary embodiment of the present disclosure.

In operation S300, an apparatus for controlling noise (e.g., the apparatus 100 for controlling noise of FIG. 1) may apply the estimation road noise (e.g., shown as x(n) in FIG. 3) measured from the acceleration sensor mounted in a vehicle to the feedforward ANC model to obtain an estimation error signal (e.g., shown as e(n) in FIG. 3).

The apparatus for controlling noise may apply the estimation road noise to the primary path based on a signal measured from the acceleration sensor, and apply the estimation weight (e.g., shown as w(n) in FIG. 3) to the secondary path. The apparatus for controlling noise may obtain the estimation error signal by applying the estimation road noise and the estimation weight to the primary path and the secondary path, respectively. For reference, the estimation error signal may be obtained based on a difference value between a value (e.g., shown as d(n) in FIG. 3) obtained by applying the estimation road noise to the primary path and a value (e.g., y(n) in FIG. 3) obtained by applying the estimation weight to the secondary path.

The apparatus for controlling noise may remove an internal noise of the vehicle based on the estimation road noise and the estimation weight. In other words, the estimation road noise measured from the acceleration sensor may be generated as the internal noise of the vehicle. The apparatus for controlling noise may remove the internal noise of the vehicle with the antiphase noise based on the estimation road noise and the estimation weight.

In operation S310, the apparatus for controlling noise may be configured to generate a training input including the estimation error signal and a training output in which the estimation road noise and the estimation weight are paired, based on removal of the internal noise by a predetermined amount of noise. For reference, in an exemplary embodiment of the present disclosure, for convenience of description, it is mainly described that the predetermined noise is 3 dB, but embodiments are not limited thereto.

In operation S320, the apparatus for controlling noise may train the noise control model based on the training input and training output. In more detail, the apparatus for controlling noise may train the noise control model based on the training input in which a road flag representing each of at least one road condition and an estimation error signal are paired, and the training output.

As an exemplary embodiment of the present disclosure, the noise control model may include a neural network. The neural network may include a plurality of layers, each of which includes a plurality of nodes. The node may include a node value determined based on an activation function. A node of an arbitrary layer may be connected to a node (e.g., another node) of another layer through a link (e.g., a connection edge) including a connection weight. The node value of a node may be propagated to other nodes via links. In an inference operation of the neural network, node values may be forward propagated from a previous layer to a next layer.

For example, in the noise control model, a forward propagation operation may represent an operation of propagating a node value based on input data in a direction from an input layer of the noise control model to an output layer. That is, a node value of a corresponding node may be propagated (e.g., forward propagation) to a node (e.g., a next node) of a next layer connected to a node through a connection edge. For example, a node may receive a value weighted by a connection weight from a previous node (e.g., a plurality of nodes) connected through a connection edge.

For example, the nodes of the input layer may include 129 nodes. The training input may represent an input in which the road flag representing each of at least one road condition and the estimation error signal are paired. The road flag may include highways, general roads, unpaved roads, roads including child protection areas, national roads, and flags on bridges. The road flag may be expressed in one dimension. In other words, the road flag may be applied to one node of the input layer. On the other hand, the estimation error signal may include 128 different frequency components in which noise is transformed by Fast Fourier Transform (FFT). In other words, the estimation error signal may be applied to 128 nodes of the input layer.

For example, the nodes of the output layer may include 256 nodes. The training output may represent an output in which an estimation road noise and an estimation weight are paired. The estimation road noise may include 128 different frequency components in which the noise is transformed by Fast Fourier Transform. Furthermore, the estimation weights may include weights for 128 different frequency components in which noise is transformed by Fast Fourier Transform. In other words, the estimation road noises and estimation weights may be output from 256 nodes of the output layer.

A node value of a node may be determined based on applying an activation function to a sum (e.g., a weighted sum) of weighted values received from previous nodes. Parameters of the neural network may include the connection weight described above as an example. The parameters of the neural network may be updated so that an objective function value described later changes in a targeted direction (e.g., a direction in which loss is minimized).

The trained noise control model may represent a model trained through machine learning, and in detail, may be a trained machine learning model that outputs a training output (e.g., a road noise and a weight for the road noise) from a training input (error signal).

A machine learning model (e.g., a trained noise control model) may be generated through machine learning. For example, the learning algorithm may include supervised learning, unsupervised learning, semi-supervised learning, or reinforcement learning, but embodiments are not limited to the above-mentioned examples.

The machine learning model may include a plurality of artificial neural network layers. In detail, the trained noise control model may include a shared layer including at least one convolution operation and a plurality of classifier layers (e.g., task-specific layers) connected to the shared layer. The artificial neural network may include at least one of a deep neural networks (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination thereof, but embodiments are not limited to the above examples.

In supervised learning, the above-described machine learning model may be trained based on training data including a pair of a training input and a training output mapped to the corresponding training input. For example, a machine learning model may be trained to output a training output from a training input. During learning, a machine learning model may be configured to generate a temporal output in response to a training input, and may be trained to minimize the loss between the temporal output and the training output (e.g., the target of training). During the learning process, parameters (e.g., connection weights between nodes/layers in a neural network) of a machine learning model may be updated according to a loss. For example, such learning may be performed in the apparatus for controlling noise itself in which a machine learning model is performed, or may be performed through a separate server. The machine learning model (e.g., the trained noise control model), which is completely trained, may be stored in a memory (e.g., the memory 120 of FIG. 1).

Figure 4:
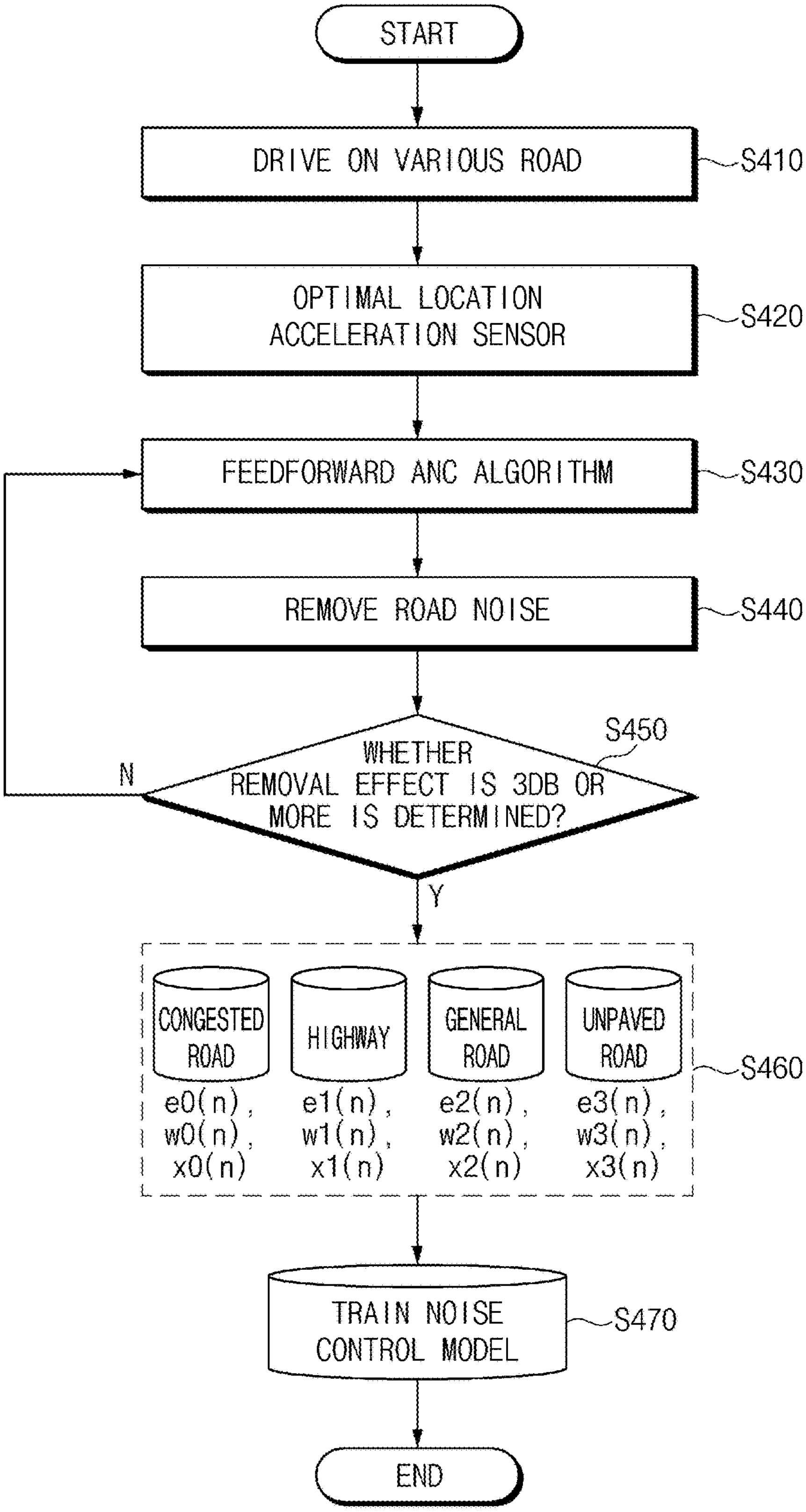
FIG. 4 is a flowchart illustrating an example of training a noise control model in an apparatus for controlling noise according to an exemplary embodiment of the present disclosure.

FIG. 4 is a flowchart illustrating an example of training a noise control model in an apparatus for controlling noise according to an exemplary embodiment of the present disclosure.

In operation S410, the apparatus for controlling noise (e.g., the apparatus 100 for controlling noise of FIG. 1) may set conditions for a vehicle to travel in various road environments. For example, the apparatus for controlling noise may set conditions for the vehicle to travel on highways, general roads, unpaved roads, roads including child protection areas, national roads, and bridges.

In operation S420, the apparatus for controlling noise may obtain an estimation road noise through an acceleration sensor provided at an optimal location in the vehicle. For example, the acceleration sensor may be provided at an optimal location in the vehicle based on conditions in which the vehicle travels on highways, general roads, unpaved roads, roads including child protection areas, national roads, and bridges.

In operation S430, the apparatus for controlling noise may apply the estimation road noise obtained from the acceleration sensor to the feedforward ANC model. The apparatus for controlling noise may be configured to generate an anti-phase noise with respect to the estimation road noise by applying the estimation road noise to the feedforward ANC model.

In operation S440, the apparatus for controlling noise may remove the estimation road noise by outputting the generated anti-phase noise through a speaker provided in the vehicle.

In operation S450, the apparatus for controlling noise may measure a change in estimation road noise controlled through the anti-phase noise (e.g., removal of estimation road noise). In the instant case, the apparatus for controlling noise may be configured to determine whether an effect of removing the estimation road noise is greater than or equal to a predetermined noise (e.g., 3 dB). When an effect of removing the estimation road noise is less than or equal to the predetermined noise, the apparatus for controlling noise may perform operation S430 again.

In operation S460, when an effect of removing the estimation road noise is greater than or equal to the predetermined noise, the apparatus for controlling noise may be configured to generate a training input in which a road flag representing each of at least one road condition and an estimation error signal are paired, and a training output in which an estimation road noise and an estimation weight are paired. In the instant case, the training input and training output may represent a training set of noises that satisfy that an effect of removing the estimation road noise is greater than or equal to the predetermined noise.

In operation S470, the apparatus for controlling noise may train a noise control model based on the generated training input and training output. For example, the apparatus for controlling noise may train the noise control model to output the estimation road noise and the estimation weight by applying the estimation error signal to the noise control model for each of at least one road condition. The apparatus for controlling noise may perform noise control by obtaining a virtual road noise in a situation in which there is no estimation road noise based on the trained noise control model.

Figure 5:
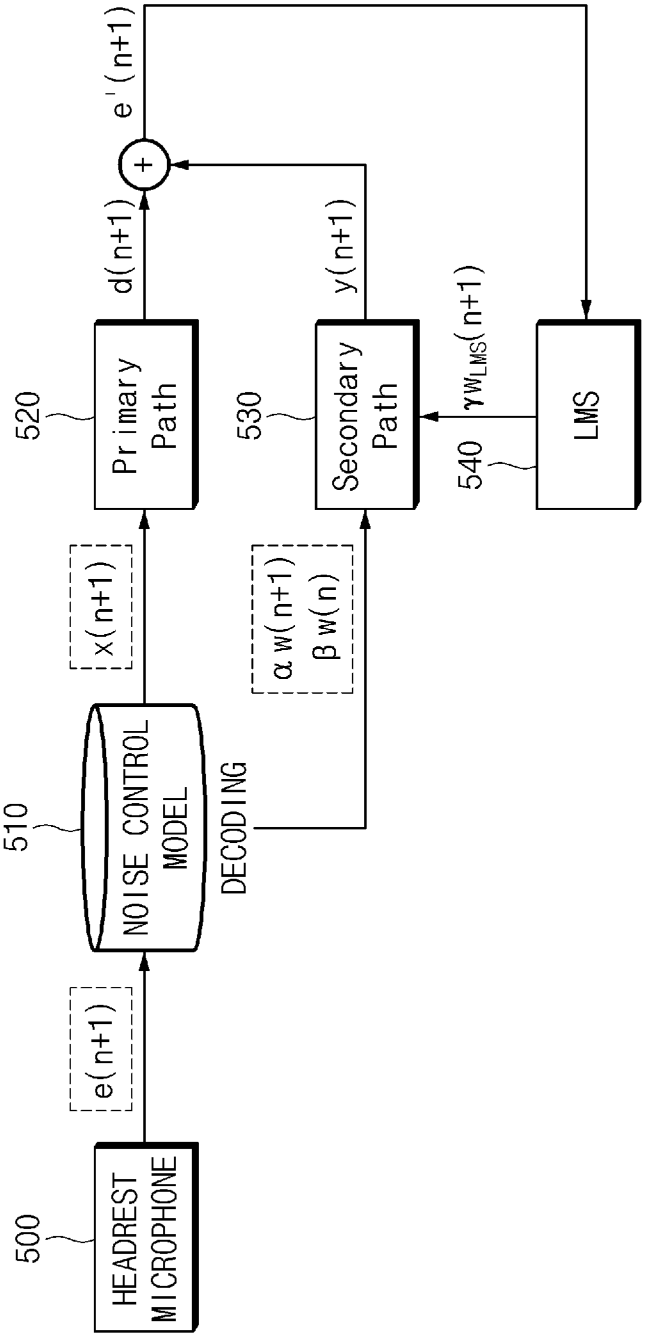
FIG. 5 is a diagram illustrating an example of controlling noise based on a trained noise control model in an apparatus for controlling noise according to an exemplary embodiment of the present disclosure.

FIG. 5 is a diagram illustrating an example of controlling noise based on a trained noise control model in an apparatus for controlling noise according to an exemplary embodiment of the present disclosure.

An apparatus for controlling noise (e.g., the apparatus 100 for controlling noise of FIG. 1) may measure an error input signal (e.g., shown as e (n+1) in FIG. 5) at a target time point (e.g., shown as the (n+1)-th time point in FIG. 5) through a headrest microphone 500. The error input signal at the target time point may represent a difference value between a target road noise at a previous time point (e.g., the n-th time point) different from the target time point and a target control noise at the previous time point different from the target time point of the target road noise. The apparatus for controlling noise may apply the measured error input signal to a noise control model 510 to obtain a virtual road noise (e.g., shown as x(n+1) in FIG. 5) and a noise weight (e.g., shown w(n+1) in FIG. 5).

The apparatus for controlling noise may perform noise control by applying a first weight and a second weight to each of the virtual road noise and the noise weight, respectively.

The first weight may represent a weight related to noise removal at the target time point, based on an error input signal at a time point different from the target time point and an error output signal at a time point different from the target time point. Similarly, the second weight may represent a weight opposite to noise removal at the target time point based on an error input signal at a time point different from the target time point and an error output signal at a time point different from the target time point. The first weight and the second weight may be expressed as following Equation 1.

$$\alpha = \frac{|e'(n)|}{|e(n)|},\ \beta = 1 - \alpha \qquad \text{[Equation 1]}$$

Where a may represent the first weight, and β may represent the second weight. Furthermore, e(n) may represent an error input signal at a time point different from the target time point, and e' (n) may represent an error output signal at a time point different from the target time point.

The first weight may be a weight related to how much noise removal is performed, and may be a weight indicating prediction performance of the trained noise control model. For example, the first weight may include a value close to 1' due to a difference between e' (n) and e(n) (e.g., when noise removal is not good). To the contrary, the first weight may include a value close to 0 (zero)' due to a difference between e' (n) and e(n) (e.g., when noise removal is successful). When the predictive performance of the noise control model is good, the first weight may include a value close to 0 (zero)' because e' (n) is close to 0 (zero)'.

The apparatus for controlling noise may apply the virtual road noise to a primary path 520 to obtain a target road noise (e.g., shown as d(n+1) in FIG. 5). For example, the apparatus for controlling noise may obtain the target road noise by applying a first virtual road noise and a second virtual road noise to the primary path 520.

For example, the apparatus for controlling noise may be configured to generate the first virtual road noise by applying the first weight to the virtual road noise, and generate the second virtual road noise by applying the second weight to the virtual road noise obtained at a time point different from the target time point. A value applied to the primary path 520 by the first virtual road noise and the second virtual road noise may be expressed as following Equation 2.

$$x'(n+1) = \alpha x(n+1) + \beta x(n) \qquad \text{[Equation 2]}$$

Where αx(n+1) may represent the first virtual road noise obtained by applying the first weight to the virtual road noise, and βx(n) may represent the second virtual road noise obtained by applying the second weight to the virtual road noise obtained at a time point different from the target time point. Furthermore, x(n+1) may indicate a value applied to the primary path 520 as a result of summing the first virtual road noise and the second virtual road noise.

The apparatus for controlling noise may obtain the target road noise by applying x' (n+1) to the primary path 520. For example, the target road noise may be expressed as following Equation 3.

$$d(n+1) = PrimaryPath\{\alpha x(n+1) + \beta x(n)\} \qquad \text{[Equation 3]}$$

Where αx(n+1)+βx(n) may represent a value applied to the primary path 520 and d(n+1) may represent a target road noise.

The apparatus for controlling noise may apply x' (n+1) to the primary path 520 to obtain the target road noise considering various reflection environments of the vehicle (e.g., an environment in which sound waves overlap). In other words, the target road noise may be noise that a driver of the vehicle can audibly hear as noise generated from tires is reflected by the interior of the vehicle, the steering wheel, or surrounding objects. For reference, in an exemplary embodiment of the present disclosure, x' (n+1) may be applied to the primary path 520 and the target road noise may be transmitted to the driver of the vehicle through the vehicle speaker.

When noise removal is successful (e.g., when a in Equation 1 is close to 0 (zero)), x' (n+1) may be close to the value of a virtual road noise obtained at a time point different from the target time point. In other words, when noise removal is successful, x' (n+1), which is a value applied to the primary path 520, may represent the virtual road noise obtained at a time point different from the target time point, instead of the virtual road noise at the target time point.

To the contrary, when noise removal is not successful (e.g., when a in Equation 1 is close to 1'), x' (n+1) may be close to the virtual road noise value at the target time point. In other words, when noise removal is not successful, x' (n+1), which is the value applied to the primary path 520, may represent the virtual road noise obtained at a different view from the target view, instead of the virtual road noise at the target view.

The apparatus for controlling noise may apply the first target weight and the second target weight to a secondary path 530 to obtain a target control noise (e.g., shown as y(n+1) in FIG. 5). For example, the apparatus for controlling noise may be configured to generate the first target weight by applying the first weight to the noise weight. Furthermore, the apparatus for controlling noise may be configured to generate the second target weight by applying the second weight to the noise weight obtained at a time point different from the target time point.

However, the method of obtaining the target control noise is not limited thereto. For example, the apparatus for controlling noise may obtain the target control noise by applying, to the secondary path 530, the first target weight, the second target weight, the third target weight, and the modified virtual road noise (e.g., x' (n+1) in Equation 2). Values applied to the secondary path 530 by the first target weight, the second target weight, and the third target weight may be expressed as following Equation 4.

$$w'(n+1) = \alpha w(n+1) + \beta w(n) + \gamma W_{LMS}(n+1) \quad \text{[Equation 4]}$$

Where $\alpha$w(n+1) may represent a first target weight obtained by applying a first weight to a noise weight, $\beta$w(n) may represent a second target weight obtained by applying a second weight to a noise weight obtained at a time point different from the target time point, $\gamma W_{LMS}$(n+1) may represent a third target weight updated by an LMS 540, and w' (n+1) may represent a value applied to the secondary path 530, which is a result of summing the first target weight to the third target weight.

For example, the LMS 540, which is an adaptive filter, may represent a filter updated to minimize loss of an error output signal. For reference, $\gamma$ of the third target weight, which is a parameter of the LMS 540, may represent a parameter which is used by tuning a mixed value. In an exemplary embodiment of the present disclosure, for convenience of description, it is mainly described that $\gamma$ is a parameter including a value between 0.15 and 0.30.

The apparatus for controlling noise may obtain a target control noise by applying x' (n+1) and w' (n+1) to the secondary path 530. The value applied to the secondary path 530 may be expressed as following Equation 5.

$$\{\alpha x(n+1) + \beta x(n)\} \times \{\alpha w(n+1) + \beta w(n) + \gamma W_{LMS}(n+1)\} \quad \text{[Equation 5]}$$

Where $\alpha$x(n+1)+$\beta$x(n), which is a result of summing the first virtual road noise and the second virtual road noise, may represent x' (n+1) applied to the primary path 520, and $\alpha$w(n+1)+$\beta$w(n)+$\gamma W_{LMS}$(n+1) may represent w(n+1) which is a result of summing the first, second, and third target weights.

In other words, the apparatus for controlling noise may obtain the target control noise by applying {$\alpha$x(n+1)+$\beta$x(n)}×{$\alpha$w(n+1)+$\beta$w(n)+$\gamma W_{LMS}$(n+1)} based on the first target weight, the second target weight, the third target weight, and the virtual road noise to the secondary path 530. For example, the target control noise may be expressed as following Equation 6.

$$y(n+1) = SecondaryPath\{\{\alpha x(n+1) + \beta x(n)\} \times \{\alpha w(n+1) + \beta w(n) + \gamma W_{LMS}(n+1)\}\} \quad \text{[Equation 6]}$$

Where {$\alpha$x(n+1)+$\beta$x(n)}×{$\alpha$w(n+1)+$\beta$w(n)+$\gamma W_{LMS}$(n+1)} may represent a value applied to the secondary path 530, and y(n+1) may represent the target control noise.

The target control noise may be an antiphase noise of the virtual road noise, and may represent an antiphase noise of the virtual road noise to which the target weight is applied. Furthermore, to remove a target road noise (e.g., a noise which is generated from tires is reflected by the interior of a vehicle, a steering wheel, or surrounding objects and the driver of the vehicle can audibly hear), the apparatus for controlling noise may output the target control noise through a vehicle's speaker.

The apparatus for controlling noise may obtain an error output signal based on the target road noise and the target control noise. For example, the apparatus for controlling noise may obtain an error output signal by subtracting the target control noise from the target road noise. The error output signal may include a value close to 0 (zero)' when the target road noise is similar to the target control noise (e.g., when the noise heard in the driver's ear of a vehicle is similar to the antiphase noise signal reproduced in reverse through the speaker).

The apparatus for controlling noise may set the error output signal as an error input signal at a time point subsequent to the target time point. The error input signal at a time point subsequent to the target time point may be expressed as following Equation 7.

$$e(n+2) = e'(n+1) = |d(n+1) - y(n+1)| \quad \text{[Equation 7]}$$

Where |d(n+1)−y(n+1)| may represent the absolute value of the difference between the target road noise and the target control noise, e' (n+1) may represent an error output signal at a target time point (e.g., the (n+1)-th time point), and e(n+2) may represent an error input signal at a time point (e.g., the (n+2)-th time point) subsequent to the target time point. The apparatus for controlling noise may perform noise control according to the target road noise and the target control noise at a time point following the target time point by applying the error input signal at a time point subsequent to the target time point to the trained noise control model.

Figure 6:
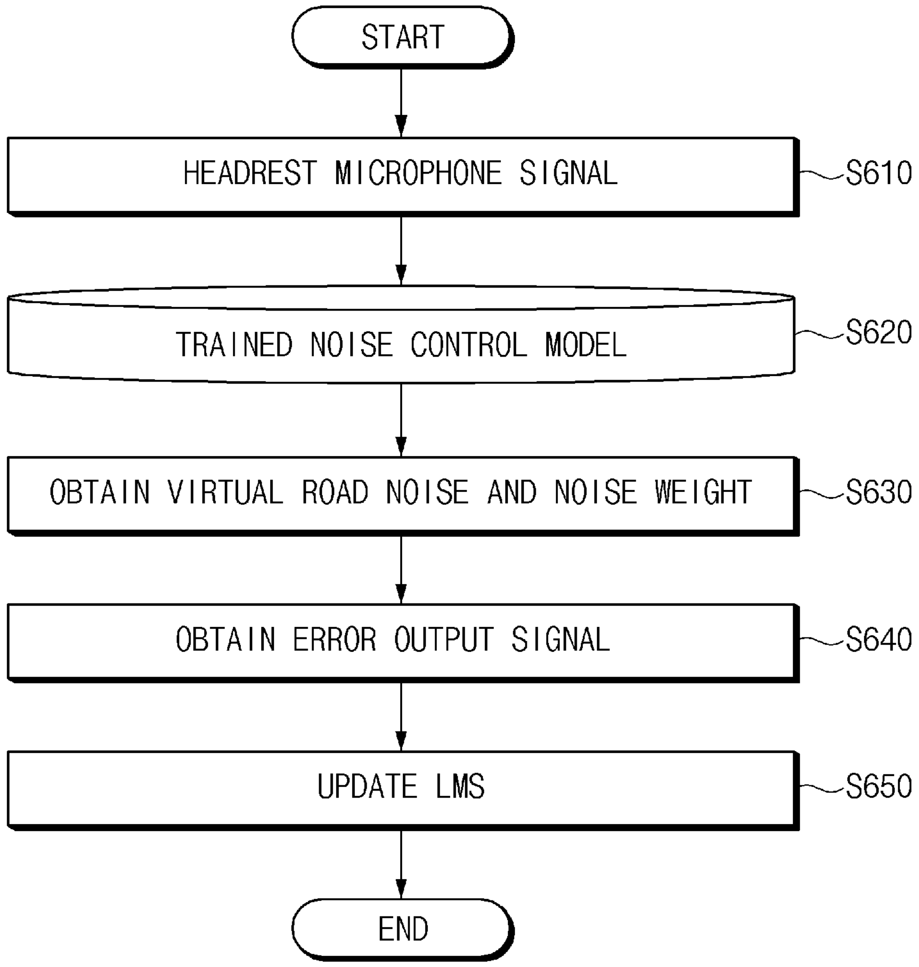
FIG. 6 is a flowchart illustrating an example of controlling noise based on a trained noise control model in an apparatus for controlling noise according to an exemplary embodiment of the present disclosure.

FIG. 6 is a flowchart illustrating an example of controlling noise based on a trained noise control model in an apparatus for controlling noise according to an exemplary embodiment of the present disclosure.

In operation S610, the apparatus for controlling noise (e.g., the apparatus 100 for controlling noise of FIG. 1) may measure an error input signal through a microphone located near a headrest inside a vehicle. The error input signal may be a difference value between a target road noise at a time point preceding a target time point and a target control noise at a time point preceding the target time point.

In operation S620, the apparatus for controlling noise may apply the error input signal to the trained noise control model. The apparatus for controlling noise may perform noise control without obtaining a road noise through an acceleration sensor of the vehicle by applying the error input signal to the trained noise control model.

In operation S630, the apparatus for controlling noise may obtain a virtual road noise and a noise weight by applying the error input signal to the trained noise control model. The apparatus for controlling noise may obtain a target road noise by applying the virtual road noise to the primary path. The driver of the vehicle may audibly recognize the noise of the vehicle through the target road noise. Unlike this, the apparatus for controlling noise may obtain the target control noise by applying a result of applying the noise weight to the virtual road noise to the secondary path. The driver of the vehicle may audibly recognize a situation in which the vehicle noise is removed from the target control noise through the target control noise output from the vehicle speaker.

In operation S640, the apparatus for controlling noise may obtain an error output signal. The apparatus for controlling noise may obtain the error output signal based on a difference between the target road noise and the target control noise. The error output signal may be set as the error input signal at a time point subsequent to the target time point.

In operation S650, the apparatus for controlling noise may apply the error output signal to the LMS to update the LMS so that the loss of the error output signal is minimized. Furthermore, the apparatus for controlling noise may obtain a third target weight (e.g., Equation 3 of FIG. 5) from the updated LMS.

Figure 7:
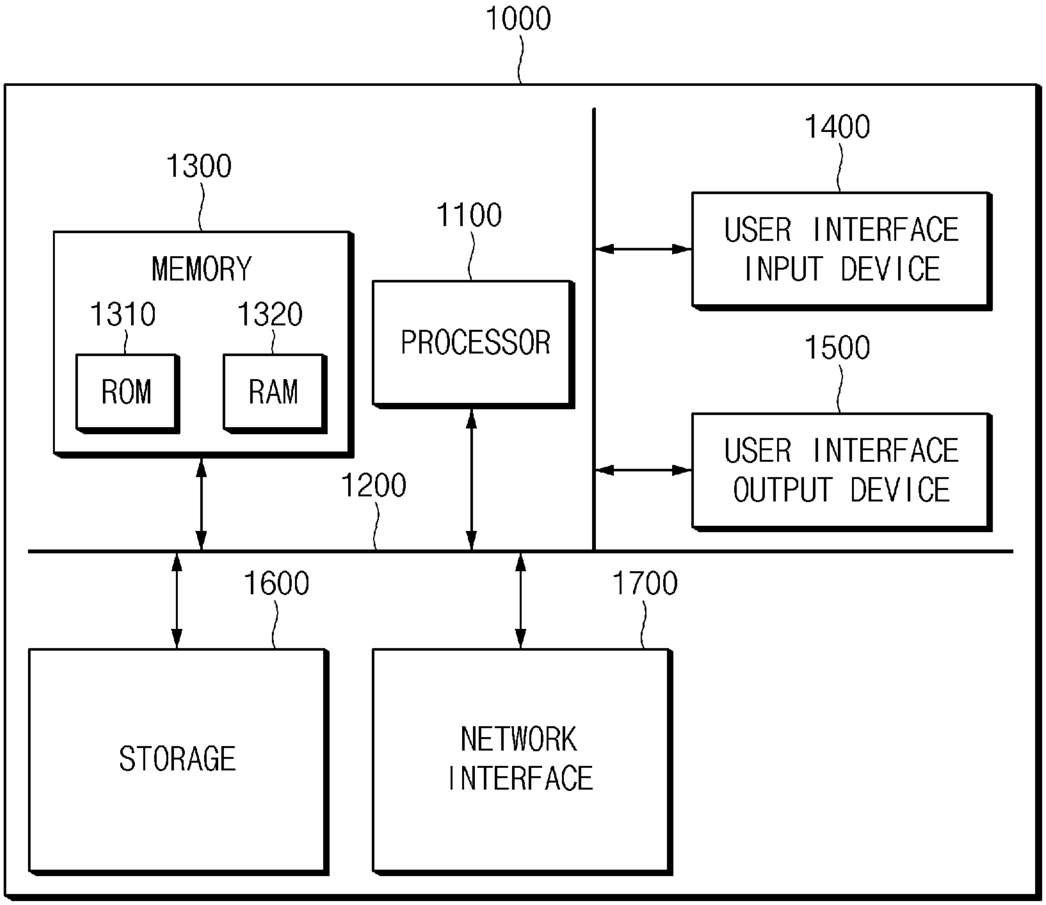
FIG. 7 is a block diagram illustrating a computing system for executing a method of controlling noise according to an exemplary embodiment of the present disclosure.

FIG. 7 is a block diagram illustrating a computing system for executing a method of controlling noise according to an exemplary embodiment of the present disclosure.

Referring to FIG. 7, a computing system 1000 for executing a method of controlling noise may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM 1310) and a random access memory (RAM 1320).

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

Although embodiments of the present disclosure have been described for illustrative purposes, those skilled in the art will appreciate that various modifications, additions and substitutions are possible, without departing from the scope and spirit of the present disclosure.

The exemplary embodiments described above may be realized by hardware elements, software elements and/or combinations thereof. For example, the devices and components illustrated in the exemplary embodiments of the present disclosure may be implemented in one or more general-use computers or special-purpose computers, such as a processor, a controller, an arithmetic logic unit (ALU), a digital signal processor, a microcomputer, a field programmable gate array (FPGA), a programmable logic unit (PLU), a microprocessor or any device which may execute instructions and respond. A processing unit may implement an operating system (OS) or one or software applications running on the OS. Furthermore, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may include a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes which may be executed by the computer using an interpreter.

The described hardware devices may be configured to act as one or more software modules to perform the operations of the above-described exemplary embodiments of the inventive concept, or vice versa.

The effects of the apparatus for controlling noise and method thereof according to the exemplary embodiments will be described as follows.

According to the embodiments, it is possible to train a noise control model based on removal of an internal noise of a vehicle by a predetermined amount, improving the road noise estimation performance.

Furthermore, according to the embodiments, it is possible to perform noise control of a vehicle without attaching an acceleration sensor to the vehicle based on a virtual road noise and a noise weight obtained by applying an error input signal at a target time point to a trained noise control model.

Furthermore, according to the embodiments, it is possible to more precisely control vehicle noise without attaching an acceleration sensor to the vehicle based on the first weight and the second weight related to noise removal at a target time point.

Furthermore, various effects that are directly or indirectly understood through the present disclosure may be provided.

While a few exemplary embodiments have been shown and described with reference to the accompanying drawings, it will be apparent to those skilled in the art that various modifications and variations may be made from the foregoing descriptions. For example, adequate effects may be achieved even when the foregoing processes and methods are conducted in different order than described above, and/or the aforementioned elements, such as systems, structures, devices, or circuits, are combined or coupled in different forms and modes than as described above or be substituted or switched with other components or equivalents.

Thus, it is intended that the present disclosure covers other realizations and other embodiments of the present disclosure provided they come within the scope of the appended claims and their equivalents.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling noise, the apparatus comprising:

a memory configured to store computer-executable instructions; and at least one processor operatively connected to the memory and configured to access the memory to execute the instructions, wherein the at least one processor is configured to:

obtain a primary virtual road noise and a noise weight by applying an error input signal of a target time point to a trained noise control model;

obtain a target road noise by applying the primary virtual road noise and a secondary virtual road noise obtained at a time point different from the target time point to a primary path;

obtain a target control noise by applying the noise weight and a noise weight obtained at a time point different from the target time point to a secondary path; and perform noise control on the error input signal based on the target road noise and the target control noise.

2. The apparatus of claim 1, wherein the at least one processor is further configured to:

obtain a first weight and a second weight related to noise removal of the target time point, based on an error input signal of a time point different from the target time point and an error output signal of a time point different from the target time point.

3. The apparatus of claim 2, wherein the at least one processor is further configured to:

generate a first virtual road noise by applying the first weight to the primary virtual road noise;

generate a second virtual road noise by applying the second weight to the secondary virtual road noise obtained at the time point different from the target time point; and obtain the target road noise by applying the first virtual road noise and the second virtual road noise to the primary path.

4. The apparatus of claim 2, wherein the at least one processor is further configured to:

generate a first target weight by applying the first weight to the noise weight;

generate a second target weight by applying the second weight to the noise weight obtained at the time point different from the target time point; and obtain the target control noise by applying the first target weight, the second target weight, and the primary virtual road noise to the secondary path.

5. The apparatus of claim 4, wherein the at least one processor is further configured to:

obtain a third target weight from an adaptive filter at the target time point; and obtain the target control noise by applying the first target weight, the second target weight, the third target weight, and the primary virtual road noise to the secondary path.

6. The apparatus of claim 1, wherein the at least one processor is further configured to:

obtain an estimation error signal by applying an estimation road noise measured from an acceleration sensor mounted in a vehicle to a feedforward active noise control (ANC) model;

remove an internal noise of the vehicle based on the estimation road noise and an estimation weight; and generate a training input including the estimation error signal and a training output in which the estimation road noise and the estimation weight are paired, based on removal of the internal noise by a predetermined amount of noise.

7. The apparatus of claim 6, wherein the at least one processor is further configured to:

train the noise control model based on the training input and the training output.

8. The apparatus of claim 7, wherein the at least one processor is further configured to:

train the noise control model based on the training input in which a road flag representing each of at least one road condition and the estimation error signal are paired, and the training output.

9. The apparatus of claim 1, wherein the at least one processor is further configured to:

obtain an error output signal based on the target road noise and the target control noise; and set the error output signal as an error input signal at a time point subsequent to the target time point.

10. The apparatus of claim 9, wherein the at least one processor is further configured to:

obtain the error output signal by subtracting the target control noise from the target road noise.

11. A method of controlling noise, the method comprising:

obtaining, by at least one processor, a primary virtual road noise and a noise weight by applying an error input signal of a target time point to a trained noise control model;

obtaining, by the at least one processor, a target road noise by applying the primary virtual road noise and a secondary virtual road noise generated obtained at a time point different from the target time point to a primary path;

obtaining, by the at least one processor, a target control noise by applying the noise weight and a noise weight obtained at a time point different from the target time point to a secondary path; and performing, by the at least one processor, noise control on the error input signal based on the target road noise and the target control noise.

12. The method of claim 11, further including:

obtaining, by the at least one processor, a first weight and a second weight related to noise removal of the target time point, based on an error input signal of a time point different from the target time point and an error output signal of a time point different from the target time point.

13. The method of claim 12, wherein the obtaining of the target road noise includes:

generating a first virtual road noise by applying the first weight to the primary virtual road noise;

generating a second virtual road noise by applying the second weight to the secondary virtual road noise obtained at the time point different from the target time point; and obtaining the target road noise by applying the first virtual road noise and the second virtual road noise to the primary path.

14. The method of claim 12, wherein the obtaining of the target control noise includes:

generating a first target weight by applying the first weight to the noise weight;

generating a second target weight by applying the second weight to the noise weight obtained at the time point different from the target time point; and obtaining the target control noise by applying the first target weight, the second target weight, and the primary virtual road noise to the secondary path.

15. The method of claim 14, wherein the obtaining of the target control noise includes:

obtaining a third target weight from an adaptive filter at the target time point; and obtaining the target control noise by applying the first target weight, the second target weight, the third target weight, and the primary virtual road noise to the secondary path.

16. The method of claim 11, wherein the obtaining of the road noise and the weight includes:

obtaining an estimation error signal by applying an estimation road noise measured from an acceleration sensor mounted in a vehicle to a feedforward active noise control (ANC) model;

removing an internal noise of the vehicle based on the estimation road noise and an estimation weight; and generating a training input including the estimation error signal and a training output in which the estimation road noise and the estimation weight are paired, based on removal of the internal noise by a predetermined amount of noise.

17. The method of claim 16, further including:

training, by the at least one processor, the noise control model based on the training input and the training output.

18. The method of claim 17, further including training, by the at least one processor, the noise control model based on the training input in which a road flag representing each of at least one road condition and the estimation error signal are paired, and the training output.

19. The method of claim 11, further including:

obtaining, by the at least one processor, an error output signal based on the target road noise and the target control noise; and setting, by the at least one processor, the error output signal as an error input signal at a time point subsequent to the target time point.

20. The method of claim 19, wherein the obtaining of the error output signal includes:

obtaining, by the at least one processor, the error output signal by subtracting the target control noise from the target road noise.

* * * * *